United States Patent
Chalaud et al.

(10) Patent No.: US 10,890,117 B2
(45) Date of Patent: Jan. 12, 2021

(54) FLUID SUPPLY SYSTEM FOR TURBINE ENGINE, INCLUDING AN ADJUSTABLE FLOW PUMP AND A FLUID METERING DEVICE

(71) Applicant: SAFRAN AIRCRAFT ENGINES, Paris (FR)

(72) Inventors: Sébastien Christophe Chalaud, Montreuil (FR); Pierre Charles Mouton, Grigny (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 305 days.

(21) Appl. No.: 16/015,435

(22) Filed: Jun. 22, 2018

(65) Prior Publication Data
US 2018/0372006 A1    Dec. 27, 2018

(30) Foreign Application Priority Data
Jun. 27, 2017   (FR) .................................. 17 55904

(51) Int. Cl.
| | |
|---|---|
| F02C 9/30 | (2006.01) |
| F02C 7/22 | (2006.01) |
| F02C 9/26 | (2006.01) |
| F02C 9/46 | (2006.01) |
| F02C 9/28 | (2006.01) |
| F02C 7/224 | (2006.01) |

(Continued)

(52) U.S. Cl.
CPC .............. *F02C 9/30* (2013.01); *F02C 7/22* (2013.01); *F02C 7/224* (2013.01); *F02C 7/232* (2013.01);
(Continued)

(58) Field of Classification Search
None
See application file for complete search history.

(56) References Cited

U.S. PATENT DOCUMENTS

| | | | |
|---|---|---|---|
| 5,086,617 A | 2/1992 | Smith | |
| 6,272,843 B1 * | 8/2001 | Schwamm | F02C 9/263 60/39.281 |

(Continued)

FOREIGN PATENT DOCUMENTS

| | | | |
|---|---|---|---|
| FR | 2 960 910 A1 | 12/2011 | |
| WO | WO-9930020 A1 * | 6/1999 | F02C 9/263 |

OTHER PUBLICATIONS

Search Report issued in French Patent Application No. 1755904 dated Feb. 15, 2018.

*Primary Examiner* — Gerald L Sung
*Assistant Examiner* — Marc J Amar
(74) *Attorney, Agent, or Firm* — Pearne & Gordon LLP

(57) ABSTRACT

A fluid supply system (1) for turbine engine, includes a high pressure volumetric pump (4), a fluid metering device (6) and a control valve (8) configured to vary the flow rate of fluid in a bypass circuit (14) so as to regulate the pressure difference between an input and an output of the metering device (6). The control valve (8) includes an obturator, the variable position of which is measured by a sensor (20). An electronic regulation system (3) compares the measured position of the obturator with a position set-point of the obturator determined as a function of a flight condition of the aircraft and/or a measured fluid temperature and corresponding to a fluid flow rate set-point in the bypass circuit (14). The flow rate of the high pressure pump (4) is commanded so that the measured position of the obturator adapts to the position set-point.

12 Claims, 3 Drawing Sheets

(51) Int. Cl.
 *F02C 7/232* (2006.01)
 *F02C 9/36* (2006.01)
 *F02C 7/236* (2006.01)
 *F02C 9/38* (2006.01)
(52) U.S. Cl.
 CPC .............. *F02C 7/236* (2013.01); *F02C 9/263* (2013.01); *F02C 9/28* (2013.01); *F02C 9/36* (2013.01); *F02C 9/38* (2013.01); *F02C 9/46* (2013.01); *F05D 2220/323* (2013.01); *F05D 2270/09* (2013.01); *F05D 2270/303* (2013.01); *F05D 2270/3015* (2013.01); *F05D 2270/54* (2013.01)

(56) References Cited

U.S. PATENT DOCUMENTS

| | | | | |
|---|---|---|---|---|
| 7,431,015 B2 * | 10/2008 | Mahoney | ................ | F23N 1/002 123/434 |
| 2001/0052338 A1 | 12/2001 | Yates | | |
| 2001/0054290 A1 * | 12/2001 | Herbison | ................... | F02C 9/32 60/734 |
| 2003/0052289 A1 * | 3/2003 | Jansen | .................... | F02C 9/263 251/63.5 |
| 2004/0177602 A1 * | 9/2004 | Griffiths | ................ | F02C 9/263 60/39.281 |
| 2005/0100447 A1 | 5/2005 | Desai et al. | | |
| 2008/0163931 A1 * | 7/2008 | Brocard | ................... | F02C 9/28 137/10 |
| 2008/0229726 A1 * | 9/2008 | Clements | ................ | F02C 9/263 60/39.281 |
| 2010/0089025 A1 * | 4/2010 | Baker | ....................... | F02C 9/36 60/39.281 |
| 2012/0219429 A1 * | 8/2012 | Heitz | ..................... | F04B 49/22 417/44.1 |
| 2016/0138473 A1 * | 5/2016 | Veilleux, Jr. | ............. | F02C 7/22 137/1 |
| 2018/0313271 A1 * | 11/2018 | Chalaud | .................. | F02C 7/236 |

\* cited by examiner

FLUID SUPPLY SYSTEM FOR TURBINE ENGINE, INCLUDING AN ADJUSTABLE FLOW PUMP AND A FLUID METERING DEVICE

TECHNICAL FIELD

The invention relates to turbine engines for aircraft. More precisely, the invention relates to a fuel supply system for turbine engine.

PRIOR ART

Turbine engine fuel supply systems of known structure include a low pressure pump, a fuel metering device and a high pressure fixed capacity volumetric pump between the low pressure pump and the fuel metering device. These supply systems also comprise a bypass circuit of the volumetric pump, also called fuel recirculation circuit. The bypass circuit includes a control valve, which is conventionally called "regulating valve", upstream of the metering device. This valve is designed to vary the flow rate of fuel in the bypass circuit, so as to maintain a substantially constant pressure difference between the input and the output of the metering device.

However, the flow rate of fuel delivered over a wide speed range of the turbine engine by the high pressure fixed capacity pump is proportional to the speed of an engine shaft of the turbine engine. This flow rate generally exceeds that which is really necessary for the actual needs of the turbine engine and its servo-controls, in particular at high speed. The result is an important recirculated flow rate in the bypass circuit, which leads to a heating of the fuel which is generally de-correlated from situations in which a heating of the fuel may be desired, for example in conditions of very low temperatures where the fuel risks icing up.

Supply systems using high pressure two-stage pumps, such as those described in the patent application FR 2 950 864 of the Snecma company, or in the publication of the application corresponding to patent US 2012266600, aim to overcome this drawback. These supply systems include a second high pressure volumetric gear pump intended to complete the supply with fuel by the first volumetric gear pump, when the turbine engine operates at high speed. This second pump is of different capacity to the first pump. The flow rate of fuel recirculated in the bypass circuit is thereby reduced, making it possible to reduce thermal rejections.

Among volumetric pumps in which the rotation speed is linked to the speed of an engine shaft of the turbine engine, variable capacity volumetric pumps also exist, making it possible to adjust the flow rate delivered by the pump in a relatively de-correlated manner from the rotation speed of the engine shaft of the turbine engine. The capacity of each pump may be commanded by a hydromechanical system, or instead by an actuator connected to a servovalve commanded by the electronic regulation system of the turbine engine as described for example in the published patent application US 2003074884. The adjustable flow rate of each pump makes it possible to limit greatly the flow rate of fuel recirculated in the bypass circuit of the supply circuit concerned. A low flow rate of recirculated fuel is obtained permanently, making it possible to limit to a very low level the thermal rejection caused by recirculation of the fuel.

In addition to volumetric gear pumps driven indirectly by an engine shaft of the turbine engine, high pressure volumetric pumps exists with drive by an electric motor of which the rotation speed is commanded by the electronic regulation system of the turbine engine and is thus de-correlated from the rotation speed of the engine shaft of the turbine engine, making it possible to adjust the flow rate delivered by the pump to as near as possible to the flow rate necessary for the actual needs of the turbine engine and its servo-controls. The drive of the electric motor requires a considerable source of electrical energy, which generally imposes that the electric generator equipping the turbine engine is dimensioned in consequence.

In other known supply systems, the electronic regulation system also commands the opening of the metering device.

The regulation of the supply with fluid of a turbine engine is still capable of improvement.

DESCRIPTION OF THE INVENTION

The invention aims to resolve at least partially the problems encountered in the solutions of the prior art.

In this respect, the invention relates to a fluid supply system for turbine engine.

The supply system includes a main circuit and a bypass circuit of the main circuit. The main circuit comprises a high pressure volumetric pump and a fluid metering device downstream of the high pressure pump.

The high pressure volumetric pump is an adjustable flow pump, the flow rate of which is configured to be commanded by a turbine engine electronic regulation system.

The fluid bypass circuit is connected to the main circuit by an input situated downstream of the high pressure volumetric pump and an output upstream of the high pressure volumetric pump.

The supply system comprises a control valve which is arranged in the bypass circuit. The control valve is connected to the main circuit upstream and downstream of the metering device, so as to be subjected to a pressure difference between an input pressure upstream of the metering device and an output pressure downstream of the metering device. The control valve includes a variable position obturator loaded by a return means and of which the position is a function of said pressure difference. The control valve is configured to vary the flow rate of fluid in the bypass circuit by the position of the obturator, so as to regulate said pressure difference at the terminals of the metering device in order to maintain it substantially equal to a predetermined value. Such a control valve is conventionally called "regulating valve" in the field of aircraft turbine engines.

According to the invention, the control valve includes a device for measuring the position of the obturator, which is connected to the electronic regulation system, so that the command of the flow rate of the high pressure volumetric pump is elaborated by comparing the measured position of the obturator with a position set-point of the obturator corresponding to a fluid flow rate set-point in the bypass circuit, said fluid flow rate set-point being capable of taking different values determined as a function of a flight condition of the aircraft and/or a measured fluid temperature.

The electronic regulation system is configured to command the flow rate of the high pressure pump, so that the position of the obturator respects a position set-point which can vary between an extreme opening position and an extreme closing position.

In other words, the position set-point of the obturator is determined as a function of a flight condition of the aircraft and/or a measured fluid temperature. The device for measuring the position of the obturator is configured to measure the opening position of the obturator, which next makes it possible to command the flow rate of the high pressure pump in order that the opening position of the obturator adapts to the position set-point, the flow rate of recirculation of the fluid in the bypass circuit being thereby modulated by the position of the obturator. The modulation of the flow rate of recirculation of the fluid notably makes it possible to modulate the thermal rejection of the fluid circuit, that is to say to adapt the thermal rejection to a desired target rejection.

The device for measuring the position of the obturator notably enables a closed loop command of the position of the obturator by variation of the flow rate of the high pressure pump. The closed loop command of the position of the obturator makes it possible to improve the regulation of the fluid supply.

In particular, the flow rate delivered by the volumetric pump is commanded so that the obturator is not in abutment, even when the state of the pump is degraded, for example in the event of wear of the pump.

The fluid for turbine engine is fuel or lubricant, typically oil.

The obturator is a variable position obturator, that is to say that it is capable of being in a plurality of equilibrium positions between an extreme opening position and an extreme closing position.

The invention may optionally comprise one or more of the following characteristics combined together or not.

According to one embodiment feature, the high pressure volumetric pump is a variable capacity pump, and the adjustable flow rate of the pump is commanded by the electronic regulation system of the turbine engine by varying the capacity of the pump.

According to one embodiment feature, the high pressure volumetric pump is a fixed capacity pump and is rotationally driven by an electric motor, the rotation speed of which is commanded by the electronic regulation system of the turbine engine.

According to a first advantageous embodiment, the electronic regulation system is configured to command the capacity of the high pressure pump, in a normal operating mode, so as to minimise the flow rate of fuel in the bypass circuit. The circulation of fluid in the bypass loop is then reduced to a necessary minimum flow rate, making it possible to reduce the thermal rejection of the fluid and thus to reduce the temperature of the fluid in the bypass circuit.

According to another advantageous embodiment, the electronic regulation system is configured to command an increase in the flow rate of the high pressure pump, when a fire is detected and/or when a measured fluid temperature is below a low temperature threshold.

This threshold may correspond to a particularly low fluid temperature. In particular, if the fluid is fuel, the threshold may correspond to a predetermined negative pressure below which ice particles are likely to form in the fuel. The increase in the flow rate of the high pressure pump, at constant engine speed of the turbine engine, implies an increase in the flow rate of fuel in the bypass loop, which causes a heating of the fuel and thus helps in preventing the phenomenon of icing up of the fuel. The low temperature threshold is likely to depend on the flight conditions.

According to another embodiment feature, the obturator includes a piston, the displacement of which covers or uncovers an opening situated in the fluid bypass circuit, and the return means includes a spring acting in compression against the piston.

According to another embodiment feature, the supply system includes temperature measurement means for measuring the temperature of the fluid in the main circuit between the output of the bypass circuit and the high pressure volumetric pump. For example, if a strainer is provided between the output of the bypass circuit and the high pressure volumetric pump, the temperature of the fluid will be preferably measured upstream of the strainer.

Advantageously, the device for measuring the position of the obturator includes a capacity sensor, such as a differential transformer with linear variation. Such a sensor is also known as an LVDT (linear variable differential transformer) sensor.

The invention also relates to a method for regulating the flow rate in a supply system as defined above. The regulation method includes a step of measuring the position of the obturator by the device for measuring the position of the obturator.

According to another advantageous embodiment, the regulation method includes a step of commanding a variation in the flow rate of the high pressure pump by the electronic regulation system, as a function of a fluid flow rate set-point in the bypass circuit and the position of the obturator measured by the device for measuring the position of the obturator.

According to an advantageous embodiment, the position of the obturator measured by the device for measuring the position of the obturator is used by the regulation system to calculate a corrected value of the pressure difference at the terminals of the metering device in order to compensate a droop error of the control valve.

BRIEF DESCRIPTION OF THE DRAWINGS

The present invention will be better understood on reading the description of exemplary embodiments, given for purely indicative purposes and in no way limiting, while referring to the appended drawings in which.

DETAILED DESCRIPTION OF PARTICULAR EMBODIMENTS

Identical, similar or equivalent parts of the different figures bear the same numerical references so as to make it easier to go from one figure to the next.

Figure 1:
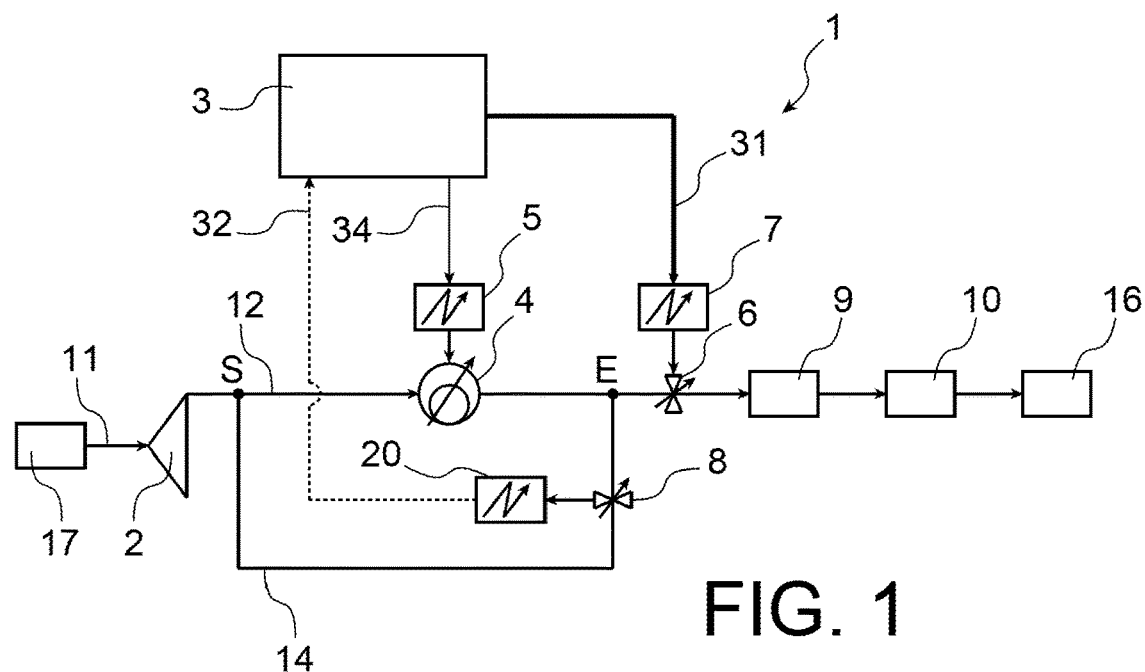
FIG. 1 is a schematic representation of a supply system according to a first embodiment of the invention.

FIG. 1 represents a supply system 1 for aircraft turbine engine. The supply system 1 includes an upstream circuit 11, a main circuit 12 and a bypass circuit 14 of the main circuit 12.

The directions "upstream" and "downstream" are defined in this document with respect to the general direction of flow of the fluid in the main circuit 12.

The upstream circuit 11 comprises a low pressure pump 2. The main circuit 12 comprises a fuel metering device 6 and a high pressure volumetric pump 4 situated between the low pressure pump 2 and the metering device 6.

The main circuit 12 supplies with fuel injectors 16 for turbine engine combustion chamber. The main circuit 12 may conventionally comprise a shut-off valve 9 and a flow meter 10, between the metering device 6 and the injectors 16.

The bypass circuit 14 is connected to the main circuit 12 by an input E situated downstream of the high pressure pump 4 and an output S upstream of the high pressure volumetric pump 4. The bypass circuit 14 comprises a control valve 8 configured to vary the flow rate of fuel in the bypass circuit 14.

The low pressure pump 2 is a centrifugal pump intended to pressurise the fuel supplying the high pressure pump 4, so as to limit the risks of cavitation in the high pressure pump 4.

The high pressure pump 4 is a variable capacity volumetric pump, with mechanical, pneumatic or electric drive. The application mainly targeted herein is a mechanical drive in which, in a manner known per se, the pump is driven indirectly by an engine shaft of the turbine engine at a drive speed proportional to the rotation speed of the engine shaft. The capacity of the high pressure pump, that is to say the flow rate at the output of the pump, is commanded by an electronic control unit 5.

The electronic control unit 5 receives orders from the electronic regulation system 3 of the turbine engine. This system is also known as Full Authority Digital Engine Control (FADEC).

Conventionally, the electronic regulation system 3 includes an engine computer with two symmetrical, redundant and full authority paths. Said engine computer is designed to take into account a command of a pilot of the aircraft.

Figure 2:
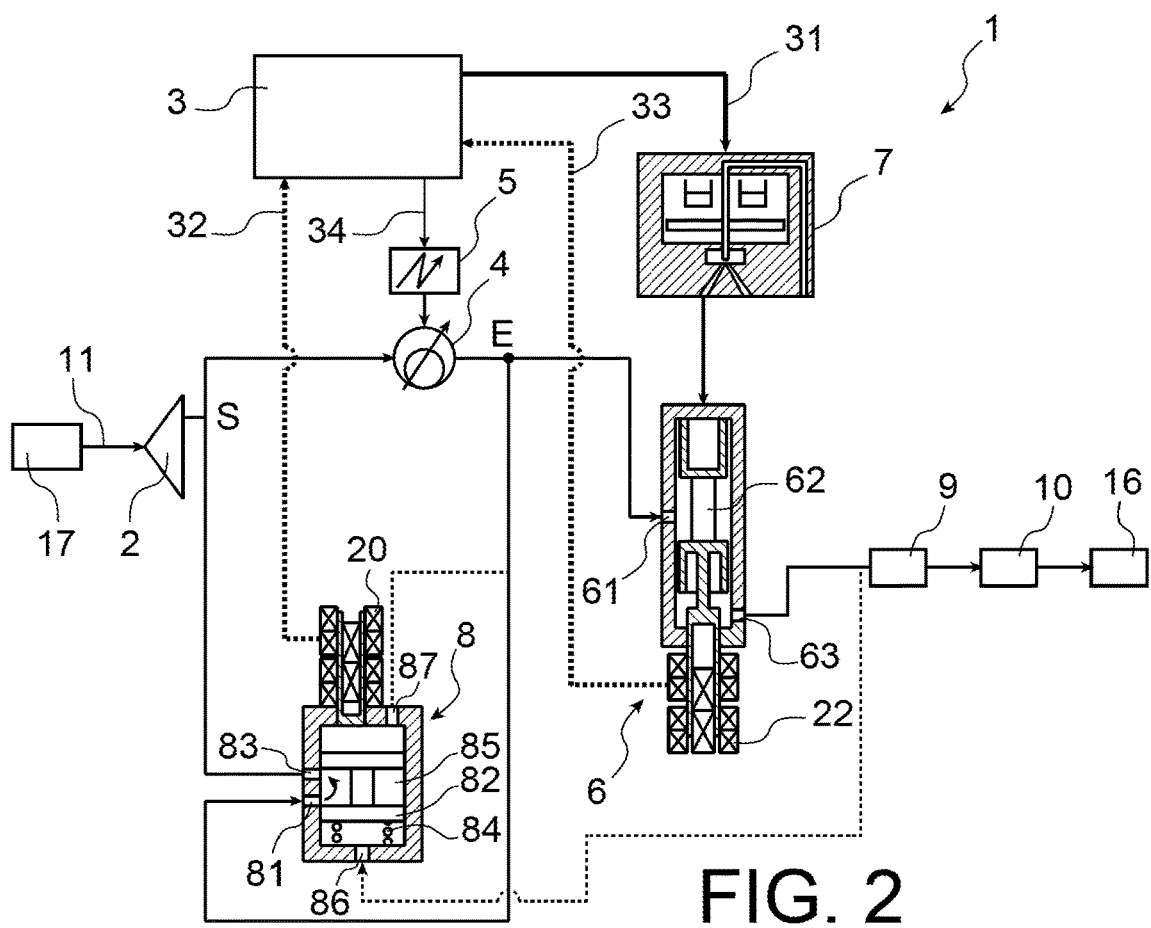
FIG. 2 represents in a more detailed manner the metering device and the control valve of the supply system, according to the first embodiment of the invention.

Jointly referring to FIGS. 1 and 2, the metering device 6 includes an input 61 at a pressure P1 and an output 63 at the pressure P2. The metering device 6 includes a moveable part 62, which is often called "slide-in unit" because it generally has the shape thereof, of which the capacity makes the section of passage of fuel through a metering slot vary. The metering device 6 is thereby configured to regulate the quantity of fuel circulating between its input 61 and its output 63.

The displacement of the slide-in unit 62 is commanded by the electronic regulation system 3 along a command line 31, via a control unit 7 of the metering device.

The position of the slide-in unit 62 is measured by a sensor 22. The sensor 22 is for example a capacity sensor such as a linear variable differential transformer. Such a sensor is also known as an LVDT sensor.

The position of the slide-in unit 62 detected by the sensor 22 is transmitted to the electronic regulation system 3 along a line for controlling 33 the opening of the metering device.

The position of the slide-in unit 62 may thus be commanded in closed loop along the command line 31 and the line for controlling 33 the opening of the metering device, by the electronic regulation system 3 via the control unit 7 of the metering device.

The shut-off valve 9 is configured to cut the fuel supply of the injectors 16 in certain situations, in particular in the event of overspeed of the engine.

The control valve 8 includes an obturator 82 formed by a moveable part which in the embodiment represented is constituted by a piston, the displacement of which covers or uncovers an opening. The piston 82 is loaded by a spring 84 in the direction of an extreme closing position in which the valve 8 does not allow fuel to circulate or in which the section of the opening of the valve is small in order to only allow a small flow of fuel in the bypass circuit 14. The extreme closing position may correspond to a limit position that the piston 82 may approach without however reaching it in practice as long as the control valve 8 operates correctly. If this limit position is formed by an abutment capable of stopping the displacement of the piston, it is necessary to avoid the piston reaching this abutment when the position set-point of the piston corresponds to a minimum fluid flow rate set-point in the bypass circuit. For a correct operation of the regulation of the pressure difference at the terminals of the metering device 6 carried out by the control valve 8, it is in fact preferable to avoiding the piston being at the displacement abutment.

The piston 82 is moveable in a chamber 85 of the control valve 8 between the extreme closing position and an extreme opening position in which the control valve 8 is configured to allow a maximum flow rate to circulate in the bypass circuit 14. In the example represented and in a manner known per se, the bypass circuit 14 communicates with the chamber 85 of the control valve 8 through two openings respectively 81 and 83. One of the two openings, for example that referenced 81, remains permanently open, whereas the other opening 83, also called nozzle, serves to regulate the flow rate passing through the valve 8 and has for this a section capable of being gradually blocked off by the piston 82 between the extreme closing position and the extreme opening position.

The piston 82 is a variable position piston, that is to say that it is capable of taking a plurality of positions between the extreme opening position and the extreme closing position of the nozzle 83, as a function of the flow rate of fuel that the control valve 8 has to allow to circulate in the bypass circuit 14 in order to maintain substantially constant the pressure difference P1-P2 between the input 61 and the output 63 of the metering device 6.

The pressure difference between the connection 87 at the pressure upstream of the metering device and the connection 86 at the pressure downstream of the metering device is substantially equal to the pressure difference P1-P2 between the input 61 and the output 63 of the metering device 6. These connections 86, 87 emerge in the chamber 85 of the control valve on either side of the piston 82.

The control valve 8 regulates the pressure difference P1-P2 between the input 61 and the output 63 of the metering device 6. More precisely, the control valve 8 is configured to maintain a constant pressure difference P1-P2 between the input 61 and the output 63 of the metering device 6, that is to say at the terminals of the metering device 6. This pressure difference is determined in particular by the compression characteristics of the spring 84.

The supply system 1 includes a position measuring device 20 which is a sensor configured to measure the position of the piston 82, without acting on this position. The measuring device 20 is for example a displacement sensor such as an LVDT sensor, which includes a moveable element solidarily in translation with the piston 82. The kinematic link between the piston 82 and the moveable element of the sensor is not represented in the figure in the interest of simplification, and may use solutions known per se such as for example a link by rigid rod.

The position of the piston 82 measured by the sensor 20 is transmitted to the electronic regulation system 3 along a measuring line 32 capable of transmitting a signal representative of the degree of opening of the control valve 8. The transmission of a signal on the measuring line 32 thus takes place in a single direction, that is to say to the electronic regulation system 3. Indeed, since the sensor 20 is used as a simple sensor not having an actuating function, it does not receive any signal coming from the electronic regulation system 3.

The regulation system 3 is configured to command the capacity of the high pressure pump 4 via the control unit 5, as a function of the position of the piston 82 measured by the position measuring device 20, along the command line 34.

The electronic regulation system 3 and the control unit 5 then command the capacity of the pump in closed loop along the command line 34 and the measuring line 32. The capacity of the pump is commanded in such a way that the position of the piston 82 is strictly compliant with its position set-point.

The position set-point of the piston 82 of the valve 8 is elaborated by the electronic regulation system 3, or in an alternative by the control unit 5 if said unit is equipped with an appropriate computing module. It is predefined strictly between the extreme opening position and the extreme closing position of the piston 82. This position set-point is notably elaborated as a function of the operating speed of the turbine engine, the temperature of the fuel and other regulation factors.

Since the position set-point of the piston 82 is able to vary in a wide range between the extreme opening position and the extreme closing position of the obturator formed by the piston, the force exerted by the return means formed by the spring 84 also has a tendency to vary as a function of the position of the piston. This leads to a relatively small variation in the pressure difference at the terminals of the metering device, which is called droop, given that this pressure difference P1-P2 is proportional to the compressive force of the spring 84. The control valve 8 is also commonly called automatic ratio valve. The variation in the pressure difference P1-P2 is considered with respect to a pre-established reference value of the pressure difference at the terminals of the metering device, said reference value being used by the regulation system 3 for the calculation of the position to impose on the slide-in unit 62 of the metering device 6 as a function of the desired volumetric flow rate at the output of the metering device.

The droop effect of the control valve 8 leads to a variation in the law linking the position of the slide-in unit 62 of the metering device 6 with the volumetric flow rate passing through the metering device. Indeed, this law involves the square root of the pressure difference P1-P2 at the terminals of the metering device. If the droop error of the control valve is not corrected, the pressure difference at the terminals of the metering device is considered constant and equal to the pre-established reference value. The variation in the above law thus cannot be taken into account. The real flow rate passing through the metering device has in this case an error compared to the flow rate set-point demanded by the regulation system 3, which flow rate set-point corresponds to a position set-point of the slide-in unit 62 calculated by the regulation system destined for the control unit 7 of the metering device. Since the variation in the pressure difference P1-P2 uniquely depends on the position of the piston 82 of the control valve 8, and since this position is measured by the sensor 20 destined for the regulation system 3, the latter can compensate the error caused by the droop taking account of a corrected value of the pressure difference P1-P2 calculated from the position value measured by the sensor 20, to elaborate a corrected position set-point of the slide-in unit 62 of the metering device.

In operation according to a first mode which is the normal operating mode, the control unit 5 commands notably the capacity of the high pressure pump 4 in such a way that the position of the piston 82 follows a position set-point of relatively low opening calculated to correspond to a fuel flow rate set-point in the bypass circuit 14. The flow rate of fuel passing through the control valve 8, that is to say the flow rate passing through the bypass circuit 14, is thereby limited to a flow rate set-point equal to a minimum acceptable flow rate as a function notably of the flight condition of the aircraft, which limits the heating of the fuel.

The notion of minimum acceptable fuel flow rate in the bypass circuit 14 is explained by several factors. Indeed, the command of the high pressure volumetric pump 4 responds to the calculation of a target flow rate to supply by the pump 4 and constituted of the sum:
- of the flow rate injected into the combustion chamber (value coming from another regulation loop),
- of the permanent flow rate and the transitory flow rate provided for the hydraulic actuators of variable geometries of the turbine engine, including the servovalves,
- of a provision of additional flow rate making it possible to cover all the response delays of the pump 4 during a command for rapid acceleration of the engine speed of the turbine engine.

When a target flow rate is commanded to the variable capacity pump, there is generally a more or less considerable delay between the instant of the command and the instant where the pump actually supplies the target flow rate. This delay may be such that if a provision for additional flow rate was not provided in the calculation of the target flow rate commanded to the pump, the metering device 6 could find itself under-supplied during a rapid acceleration command, which would lead to a "dip" in the acceleration which would penalise the operability of the engine.

The provision for additional flow rate will be modulated as a function of the flight condition, also called flight phase. Its maximum will be provided to idling phases, in order to cover cases of rapid acceleration from idling to full throttle. This flow rate provision could be reduced in other flight phases such as cruising for example, because such a rapid acceleration will not have to be made from this flight phase. For example a provision of additional flow rate could be taken making it possible to cover a lapse of 0.5 seconds of the acceleration from an idling phase.

The flow rate supplied by the pump 4 is thus always greater than the flow rate injected into the combustion chamber which is also the flow rate passing through the metering device 6 in the configuration represented, hence the necessity of a bypass circuit 14 to evacuate the excess flow rate by making it recirculate in the main circuit 12 upstream of the high pressure volumetric pump 4. In order to ensure an optimal operability of the turbine engine, the minimum acceptable flow rate in the bypass circuit 14 is calculated so as to guarantee that even in the most demanding transitory phases, such as a rapid acceleration phase from idling to full throttle, the aforesaid excess flow rate will not be totally consumed by the combustion chamber and/or the hydraulic actuators. In the normal operating mode described previously, the flow rate of fuel in the bypass circuit 14 remains relatively low and only leads to a limited heating of the fuel. It will be provided that the fuel flow rate set-point in the bypass circuit remains equal to the minimum acceptable flow rate value, in order not to further heat the fuel. In addition, since the capacity of the high pressure pump is commanded so as to minimise the flow rate of fuel in the bypass circuit 14, the mechanical energy withdrawn from an engine shaft of the turbine engine to drive the pump is also minimised, which is beneficial for the specific fuel consumption.

It is not necessary to provide a flow meter in the bypass circuit, since the measurement of the position of the piston 82 of the control valve 8 makes it possible to determine the opening section of the obturator formed by the piston 82 in association with the nozzle 83, which indirectly makes it possible to determine the flow rate passing through the valve 8 from the moment that the pressure difference between the output and the input of the high pressure volumetric pump 4 is known. The electronic regulation system 3 could comprise in a memory value tables establishing the relationship between the measured position of the piston 82 and the flow rate of fuel in the bypass circuit 14 corresponding to this position.

In a second operating mode distinct from the normal operating mode and responding to particular events, notably when a fire is detected, it is provided that the control unit 5 commands an increase in the capacity of the high pressure pump 4 even in the absence of command to accelerate the speed of the turbine engine. The greater circulation of fuel in particular in the main circuit 12 makes it possible in fact to limit heating of items of equipment situated in this main circuit and traversed by the fuel. For example, an oil/fuel heat exchanger may be provided in the main circuit 12 typically upstream of the high pressure pump 4, generally in order to cool the oil, which has the effect of heating the fuel. Certification requirements require this heat exchanger to be fire resistant, for example 15 minutes flame resistance and notably when the engine is idling, the flow rate of supplying the injectors 16 with fuel then being very low. In the prior art, these certification requirements lead to increases in the mass of the equipment to withstand heating, which are not necessary in strictly structural terms.

In order that the equipment withstands heating in the event of fire without penalising its mass, the present invention makes it possible to cool it by imposing in the main circuit 12, upstream of the input E of the bypass circuit 14, a fuel flow rate much greater than the flow rate for supplying the injectors with fuel. This is obtained thanks to the increase in the capacity of the high pressure pump 4 combined with the recirculation of the fuel via the bypass loop 14 which makes it possible to maintain at an idling level the fuel supply flow rate supplied by the metering device 6 to the injectors 16.

Herein, the expression "flight condition" is given a wide sense encompassing not only conventional flight phases but also flight in fire condition, that is to say when a fire has been detected on an engine. A flight in fire condition generally involves bringing the engine back to its idling speed before shutting it down.

Another case of particular event treated within the scope of this second operating mode concerns the risk of icing of the fluid. To address this risk, the capacity of the high pressure pump 4 is also increased on order of the control unit 5 when the temperature of the fluid in the bypass circuit 14 is below a low temperature threshold. The flow rate of fuel is consequently greatly increased in the bypass circuit 14, which leads to heating of the fuel. Since the heated fuel is re-introduced into the main circuit 12 at the level of the output S of the bypass circuit 14 to mix with fuel coming from the low pressure pump 2, this important recirculation of fuel enables the heating of the main circuit 12 downstream of the node S. This heating makes it possible to avoid the formation of ice particles in the fuel, thereby avoiding a risk of plugging of certain items of equipment of the circuit 12 by icing. The low temperature threshold depends on the flight conditions and corresponds to a particularly low temperature of the fuel in the aircraft tanks 17, for example a negative temperature below −10° C.

Yet another case of particular event treated within the scope of this second operating mode concerns the detection of a too low temperature of the oil in the lubrication circuit of the turbine engine, for example an oil temperature below a threshold, beneath which the viscosity of the oil is deleterious for the lifetime of the engine shaft line bearings. The flight condition corresponding to this event usually corresponds to an engine idling phase or taxiing of the aircraft during cold weather, shortly after the start-up of the engines, the engine oil then not having had the time to exceed the aforementioned temperature threshold. Generally, an oil/fuel heat exchanger will be provided in the main circuit 12 upstream of the high pressure pump 4 and downstream of the node S, with the aim of first cooling the engine oil by heat exchange with the fuel. Thanks to the present invention, an important recirculation of fuel may be commanded by the electronic regulation system 3 following the detection of a too low oil temperature, which makes it possible in the main circuit 12 to obtain a temperature of the fuel at the level of the heat exchanger greater than the temperature of the oil, thereby making it possible to heat the oil by the fuel.

Figure 3:
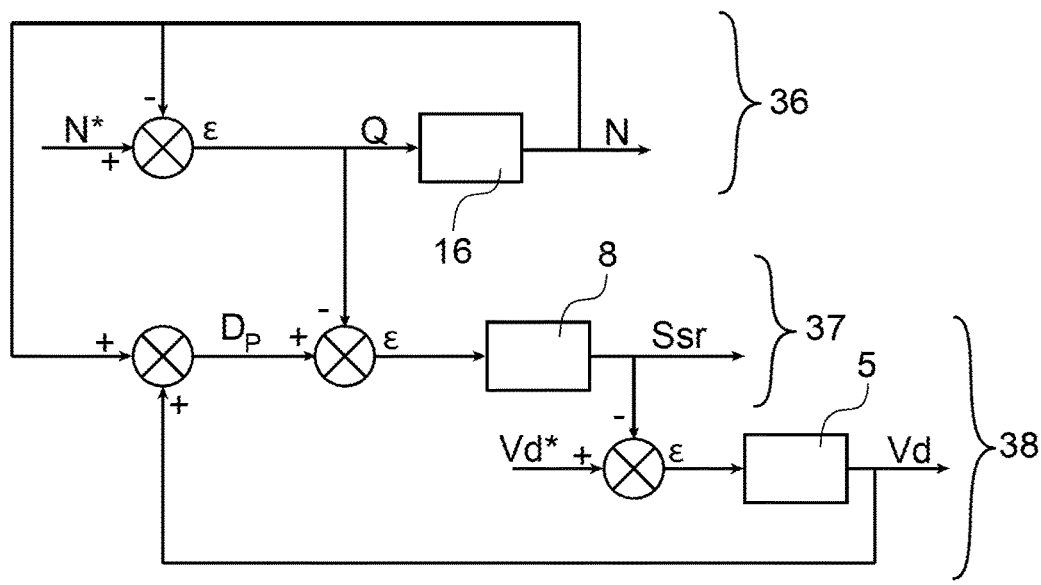
FIG. 3 is a functional schematic representation of the supply system according to the first embodiment.

FIG. 3 is a functional representation of the regulation of the fuel supply in the supply system 1.

When the pilot commands an increase in the power of the turbine engine N*, the regulation system 3 reacts by ordering via the metering device 6 an increase in the real flow rate of fuel Q in the direction of the injectors 16, along the loop 36 for regulating the opening of the metering device 6 in order to regulate the power of the engine. At the start of this process the flow rate $D_p$ at the output of the high pressure pump 4 has not yet increased. The metering device 6 is commanded to increase its passage section in order to increase the real flow rate of fuel, which tends to reduce the pressure difference P1-P2 at the terminals of the metering device.

The start of a reduction in the pressure difference P1-P2 makes the position of the piston 82 change in the direction of a reduction in the opening of the nozzle 83, so as to maintain the pressure difference P1-P2 substantially constant at the terminals of the metering device 6, along the loop 37 for regulating the opening of the control valve 8. The opening Ssr of the control valve 8 is thus reduced.

The electronic regulation system 3 then commands, through the control unit 5 and an actuating device (not represented) being able to be distinct from or integrated in the high pressure pump 4, an increase in capacity $V_d$ of the high pressure pump 4. This makes it possible to bring the piston 82 back to a set-point position strictly between its extreme opening position and its extreme closing position, which position in normal operation is close to the extreme closing position so as to limit the recirculation of fuel to a minimum acceptable flow rate predetermined as a function of the flight condition, along the loop 38 for regulating the capacity of the high pressure pump 4.

When a pilot commands a reduction in the power of the turbine engine N*, the electronic regulation system 3 reacts by ordering a reduction in real flow rate Q in the direction of the injectors 16, along the loop 36 for regulating the power of the turbine engine. At the start of this process the flow rate $D_p$ at the output of the high pressure pump 4 is not yet reduced. The metering device 6 is commanded to reduce its section of passage in order to reduce the real flow rate of fuel, which tends to increase the pressure difference P1-P2 at the terminals of the metering device.

The piston 82 thus changes position in the direction of an increase in the opening of the nozzle 83, that is to say an increase in the bypass flow rate so as to maintain the pressure difference P1-P2 substantially constant at the terminals of the metering device 6, along the loop 37 for regulating the opening of the control valve. The opening Ssr of the control valve 8 is thus increased.

The electronic regulation system 3 then commands via the control unit 5 a reduction in the capacity $V_d$ of the high pressure pump 4, so as to bring the piston 82 back to a nominal position strictly compliant with its set-point position between its extreme opening position and its extreme closing position, along the loop 38 for regulating the capacity of the high pressure pump 4.

Figure 4:
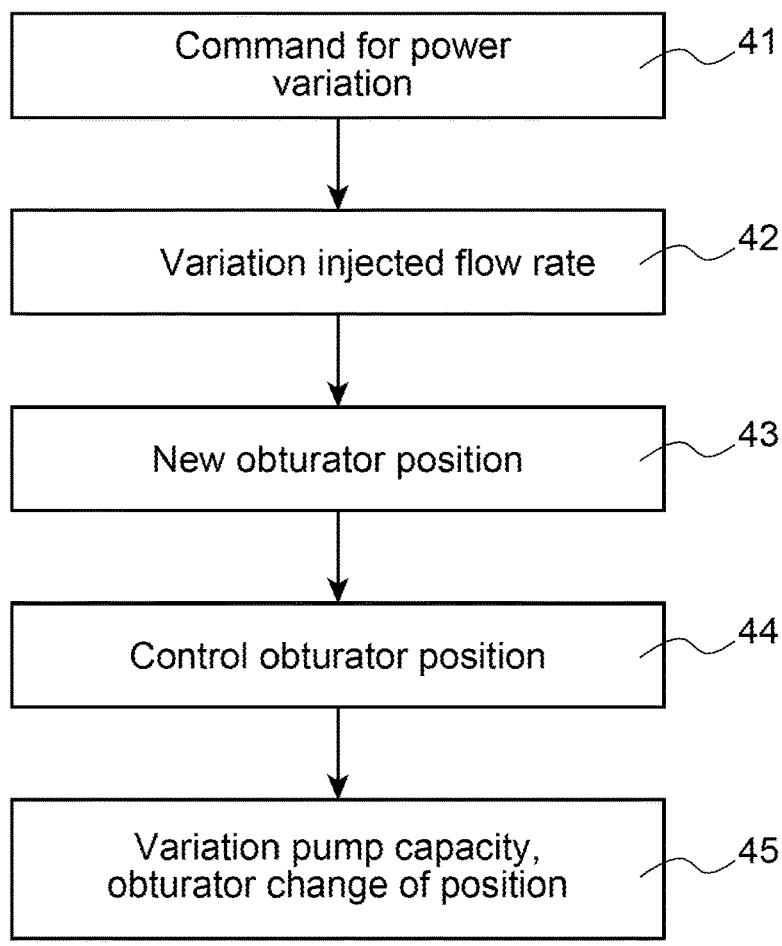
FIGS. 4 and 5 illustrate the regulation of the fuel supply by means of the supply system according to the different embodiments.

With reference to FIG. 4, a command to vary the power of the turbine engine, at step 41, leads via the fuel metering device 6 to a variation 42 in the flow rate of fuel circulating in the direction of the injectors 16. The result is a new position of the piston 82 of the control valve 8, at step 43, since the compressive force of the spring 84 acting against the piston 82 in the valve 8 makes it possible to maintain a predetermined pressure difference between the input and the output of the metering device. The measurement of the position of the piston 82, at step 44, is used by the electronic regulation system 3 to command the variation in the capacity of the high pressure pump 4 in order that the piston 82 recovers its nominal position between the extreme opening position and the extreme closing position, at step 45.

Figure 5:
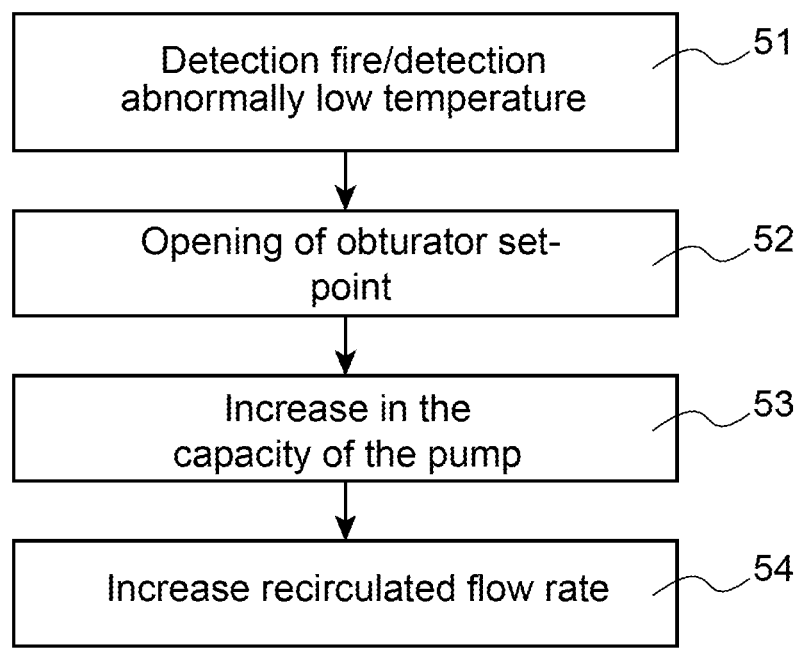

In FIG. 5, a detection of fire or instead a detection of an abnormally low fuel temperature, at step 51, makes the electronic regulation system 3 generate a set-point for placing in position the piston 82 which can be close to the position corresponding to the full opening of the obturator formed by the piston 82 associated with the nozzle 83. This opening of the obturator is obtained thanks to an increase in the capacity of the pump 4 commanded via the control unit 5, the pressure difference P1-P2 always being maintained constant. The flow rate of fuel recirculated in the bypass loop 14 is then increased by the opening of the obturator.

Generally speaking, the measurement of the position of the piston 82 and its taking into account by the electronic regulation system 3 for the command of the capacity of the pump 4 enables a better regulation of the flow rate of fuel in the supply system 1.

They notably make it possible to command the capacity of the high pressure pump 4 while taking fuller account of the displacement response time of the piston 82.

They also make it possible to compensate the droop error of the control valve 8, knowing that as explained previously said droop error may have repercussions on the command of the metering device 6.

Furthermore, the risk of not detecting a potential accidental blockage of the piston 82 either in extreme opening or closing position is normally eliminated, on account of the control of the position of the piston by the sensor 20.

Obviously, various modifications may be made by those skilled in the art to the invention that has just been described without going beyond the scope of the description of the invention.

The unit 5 for commanding the capacity of the high pressure pump 4 may also form an integral part of the electronic regulation system 3. Similarly, the unit 7 for commanding the metering device may form an integral part of the electronic regulation system 3.

It is also possible that the electronic regulation system 3 is physically split into two parts or cases, with a main part connected to an auxiliary part which may be integrated in a same unit with the control unit 5, for example formed by a same case. This auxiliary part will be dedicated notably to the processing of the measurement signal supplied by the position measuring device 20. In this case, the auxiliary part of the regulation system 3 grouped together with the control unit 5 is connected to the position measuring device 20 and it elaborates itself, as a function of the position of the piston 82 of the control valve 8 measured by the device 20, the set-point to command the capacity of the high pressure pump 4.

The supply system 1 may also comprise additional hydraulic resistances such as heat exchangers or filters.

It may furthermore be envisaged to replace the variable capacity high pressure volumetric pump 4 by a fixed capacity high pressure volumetric pump, providing that the drive of this fixed capacity volumetric pump is made by a rotating machine of which the rotation speed may be managed by the electronic regulation system 3. The rotating machine will preferably be a variable speed electric motor. The flow rate of fluid supplied by the pump is then proportional to the speed of the electric motor. The management of the electric motor may be sufficiently precise, with a sufficiently rapid response, so that the provision of additional flow rate provided in the calculation of the target flow rate to supply by the pump is relatively reduced, and for example below that provided in the case where the volumetric pump 4 is a variable capacity pump.

However, there remains an interest in providing a fluid metering device downstream of the high pressure volumetric pump, with a fluid bypass circuit such as described previously, to produce a fluid supply system according to the invention in order to be able to vary the flow rate of fluid recirculated in the bypass circuit as a function in particular of a flight condition of the aircraft and/or a measured fluid temperature. The same advantages as described previously relative to the response of the fluid supply system to particular events and flight conditions may be obtained.

In such an embodiment, since the capacity of the pump 4 is fixed, it is obviously no longer this capacity that would be commanded by the control unit 5 but the speed of the electric motor driving the pump 4.

Generally speaking, it may be envisaged to use any technology of high pressure volumetric pump, the flow rate of which may be managed in a manner de-correlated from the engine speed of an engine shaft of the turbine engine, from the moment that the range of flow rates which can be supplied by the pump with this management corresponds substantially to a range of target flow rates making it possible to cover all flight conditions.

The invention claimed is:

1. A fluid supply system for aircraft turbine engine, including:
an electronic regulation system,
a main circuit including:
a high pressure volumetric pump with adjustable flow rate, wherein the flow rate of the high pressure volumetric pump is commanded by the electronic regulation system of the turbine engine, and
a fluid metering device which is located downstream of the high pressure volumetric pump,
wherein the supply system further includes:
a fluid bypass circuit which is connected to the main circuit by an input which is situated downstream of the high pressure pump and by an output which is situated upstream of the high pressure volumetric pump, and
a control valve which is arranged in the bypass circuit, wherein the control valve is connected to the main circuit both upstream and downstream of the metering device so as to be subjected to a pressure difference between an input pressure upstream of the metering device and an output pressure downstream of the metering device, wherein the control valve includes a variable position obturator, wherein the position of the obturator of the control valve depends of said pressure difference between the input pressure and the output pressure, wherein the control valve is configured to vary the flow rate of fluid in the bypass circuit by the position of the obturator, so as to regulate said pressure difference between the input pressure and the output pressure in order to maintain said pressure difference substantially equal to a predetermined value, wherein the control valve includes a sensor for measuring the position of the obturator, wherein the sensor is connected to the electronic regulation system, so that the electronic regulation system is able to elaborate the command of the flow rate of the high pressure volumetric pump by comparing the measured position of the obturator with a position set-point of the obturator corresponding to a fluid flow rate set-point in the bypass circuit, wherein said fluid flow rate set-point is capable of taking different values determined depending of a flight condition of the aircraft and/or depending of a measured fluid temperature, wherein the electronic regulation system is configured to command the flow rate of the high pressure pump, so that the position of the obturator corresponds to a position set-point which can vary between an extreme opening position and an extreme closing position, wherein the electronic regulation system is configured to use the measured position of the obturator to calculate a corrected value of the pressure difference between the input pressure and the output pressure in order to compensate a droop error of the control valve.

2. The fluid supply system according to claim 1, wherein the high pressure volumetric pump is a variable capacity pump, and wherein the adjustable flow rate of the pump is commanded by the electronic regulation system of the turbine engine by varying the capacity of the pump.

3. The fluid supply system according to claim 1, wherein the high pressure volumetric pump is a fixed capacity pump, wherein the high pressure volumetric pump is rotationally driven by an electric motor, and wherein the rotational speed of the electric motor is commanded by the electronic regulation system.

4. The fluid supply system according to claim 1, wherein the electronic regulation system is configured to command the flow rate of the high pressure pump, in a normal operating mode, so as to minimise the flow rate of fluid in the bypass circuit based on the position of the obturator of the control valve.

5. The fluid supply system according to claim 1, wherein the electronic regulation system is configured to command an increase in the flow rate of the high pressure pump when a fire is detected and/or wherein the electronic regulation system is configured to command an increase in the flow rate of the high pressure pump when a measured fluid temperature is below a low temperature threshold.

6. The fluid supply system according to claim 1, wherein the obturator includes a piston, wherein the displacement of the piston covers or uncovers an opening which is situated in the fluid bypass circuit, and wherein the obturator is loaded by a spring acting in compression against the piston.

7. The fluid supply system according to claim 1, wherein the fluid supply system is configured for measuring the temperature of the fluid in the main circuit between the output of the bypass circuit and the high pressure volumetric pump.

8. The fluid supply system according to claim 1, wherein the sensor includes a displacement sensor.

9. The fluid supply system according to claim 8, wherein the sensor includes a linear variable differential transformer.

10. The fluid supply system according to claim 1, wherein the fluid is fuel.

11. A regulation method for regulating the flow rate of fluid in a fluid supply system for aircraft turbine engine, including:
an electronic regulation system,
a main circuit including:
a high pressure volumetric pump with adjustable flow rate, wherein the flow rate of the high pressure volumetric pump is commanded by the electronic regulation system of the turbine engine, and
a fluid metering device which is located downstream of the high pressure volumetric pump,
wherein the supply system further includes:
a fluid bypass circuit which is connected to the main circuit by an input which is situated downstream of the high pressure pump and by an output which is situated upstream of the high pressure volumetric pump, and
a control valve which is arranged in the bypass circuit, wherein the control valve is connected to the main circuit both upstream and downstream of the metering device so as to be subjected to a pressure difference between an input pressure upstream of the metering device and an output pressure downstream of the metering device, wherein the control valve includes a variable position obturator, wherein the position of the obturator of the control valve depends of said pressure difference between the input pressure and the output pressure, wherein the control valve is configured to vary the flow rate of fluid in the bypass circuit by the position of the obturator, so as to regulate said pressure difference between the input pressure and the output pressure in order to maintain said pressure difference substantially equal to a predetermined value, wherein the control valve includes a sensor for measuring the position of the obturator, wherein the sensor is connected to the electronic regulation system, so that the electronic regulation system is able to elaborate the command of the flow rate of the high pressure volumetric pump by comparing the measured position of the obturator with a position set-point of the obturator corresponding to a fluid flow rate set-point in the bypass circuit, wherein said fluid flow rate set-point is capable of taking different values determined depending of a flight condition of the aircraft and/or depending of a measured fluid temperature, wherein the electronic regulation system is configured to command the flow rate of the high pressure pump, so that the position of the obturator corresponds to a position set-point which can vary between an extreme opening position and an extreme closing position, wherein the method includes a step of measuring the position of the obturator by the sensor, wherein the measured position of the obturator is used by the electronic regulation system to calculate a corrected value of the pressure difference between the input pressure and the output pressure in order to compensate a droop error of the control valve.

12. The regulation method according to claim 11, including a step of commanding a variation in the flow rate of the high pressure pump by the electronic regulation system, depending of a fluid flow rate set-point in the bypass circuit and of the position of the obturator measured by the sensor.

* * * * *